(12) United States Patent
Kawai

(10) Patent No.: US 6,396,882 B1
(45) Date of Patent: May 28, 2002

(54) FREQUENCY SCANNING TYPE RECEIVER

(75) Inventor: Kazuo Kawai, Tokyo (JP)

(73) Assignee: General Research of Electronics, Inc., Tokyo (JP)

( * ) Notice: Subject to any disclaimer, the term of this patent is extended or adjusted under 35 U.S.C. 154(b) by 0 days.

(21) Appl. No.: 09/259,663

(22) Filed: Feb. 26, 1999

(30) Foreign Application Priority Data

May 14, 1998 (JP) ............................................. 10-150685

(51) Int. Cl.$^7$ ............................................... H04L 27/14
(52) U.S. Cl. ...................................... 375/334; 329/300
(58) Field of Search ................................. 375/324, 328, 375/334, 344; 455/161.1, 164.1, 164.2; 329/300, 302

(56) References Cited

U.S. PATENT DOCUMENTS 5,999,577 A * 12/1999 Kawai ........................ 375/334
6,137,846 A * 10/2000 Kawai ........................ 375/344

* cited by examiner

Primary Examiner—Amanda T. Le
(74) Attorney, Agent, or Firm—Flynn, Thiel, Boutell & Tanis, P.C.

(57) ABSTRACT

In a frequency scanning receiver for a packet FSK signal of such a type that a duration to issue a center frequency is provided in head portion thereof, the packet FSK signal is scanned by a scanning voltage from VFO in a frequency converter to provide an IF signal which is applied to a frequency detector to provide a demodulated base band signal. The demodulated base band signal is applied to a comparator to compare it with a reference signal and a conversion point detector detects inversion of an output signal of the comparator. A sample and hold circuit holds a sample value of the scanning voltage when the inversion is detected until end of a packet to keep a center frequency error in a minimum condition.

2 Claims, 1 Drawing Sheet

FREQUENCY SCANNING TYPE RECEIVER

FIELD OF THE INVENTION

The present invention relates to an improvement of techniques for constructing a receiver circuit for receiving a packet FSK (Frequency Shift Keying) signal by a receiver having frequency scanning faculty.

DESCRIPTION OF THE PRIOR ART

There are various kinds of types of packet FSK signals. One of them is a packet FSK signal of such type that a duration to issue a center frequency is provided in a head portion of a packet.

In a case that a packet FSK signal having frequency error is received, in general, firstly, frequency scanning of a local oscillator is done and then when the frequency of a received signal becomes within the pass band of an IF (Intermediate Frequency), a carrier detector detects this situation to render the frequency scanning stop. However, at this time, the frequency of the IF signal does not coincide with that of an object signal, so that frequency error remains yet. So, it is necessary to remove this frequency error by causing an AFC (Automatic Frequency Circuit) to operate at the same time with stop of frequency scanning or to correct a DC offset component provided in a base band portion owing to remained frequency error.

Various correcting circuits for a packet signal having packet construction wherein a bit synchronizing signal is provided in a head portion thereof are proposed to attain the above mentioned object. However, there is no correcting circuit to correct said frequency error for a packet FSK signal such type that a duration to issue a center frequency is provided in a head portion of a packet in general a frequency error correcting circuit for a packet signal having packet construction wherein a bit synchronizing signal exists in a head portion thereof is used.

Followings are known for correcting methods in employed in these correcting circuits.

As representatives thereof there are known 1) a method in which there are disposed a positive and a negative peak hold circuit and the center level is obtained, starting from an average of peak values held therein; 2) a method in which there are disposed a positive and a negative dead zone circuit having dead zone voltage widths, which are in accordance with a positive and a negative peak value width, respectively, of the base band signal, and the center error is obtained by taking out components outputted, exceeding these dead zone voltage widths, in the base band signal; 3) a method in which the center level obtained by integrating a bit synchronizing signal, which is at a beginning of the packet signal, over a 2 bit length (a period of time of 2/baud sec (baud being transmission speed)); 4) a method in which the bit synchronizing signal is sampled twice with an interval of 1/baud sec and the center level is obtained, starting from an average of these sampled values; etc.

However these methods have such disadvantages that two circuits have same faculty are required or construction of a control circuit is complicated because these methods do not make use of a center frequency information in a head portion of a packet.

SUMMARY OF THE INVENTION

An object of the present invention is therefor to provide a correcting circuit capable of correcting a center frequency error or an error in the center level of a base band signal with a simple function and construction.

A frequency scanning receiver for a packet FSK signal of such a type that a duration,to issue a central frequency is provided in a head portion thereof according to the present invention comprises conversion point detecting means for detecting a time point when a demodulated base band signal obtained by demodulating said packet FSK signal pass through a conversion point in said duration; and hold means for holding a scanning voltage to scan said packet FSK signal.

In said frequency scanning receiver, said conversion point detecting means may include a comparator for comparing said demodulated base band signal with a reference voltage and a carrier detector for detecting whether there is said base band signal or a IF signal or not, a conversion point detector for detecting inversion of an output signal from the comparator at said time point, and a flip-flop circuit set by an output signal of said conversion point detector and reset by an output signal from said carrier detector representing that there is no said packet FSK signal, and said hold means may include a sample & hold circuit a sample value of said scanning voltage by a set output from said flip-flop circuit.

DESCRIPTION OF THE PREFERRED EMBODIMENTS

Figure 1:
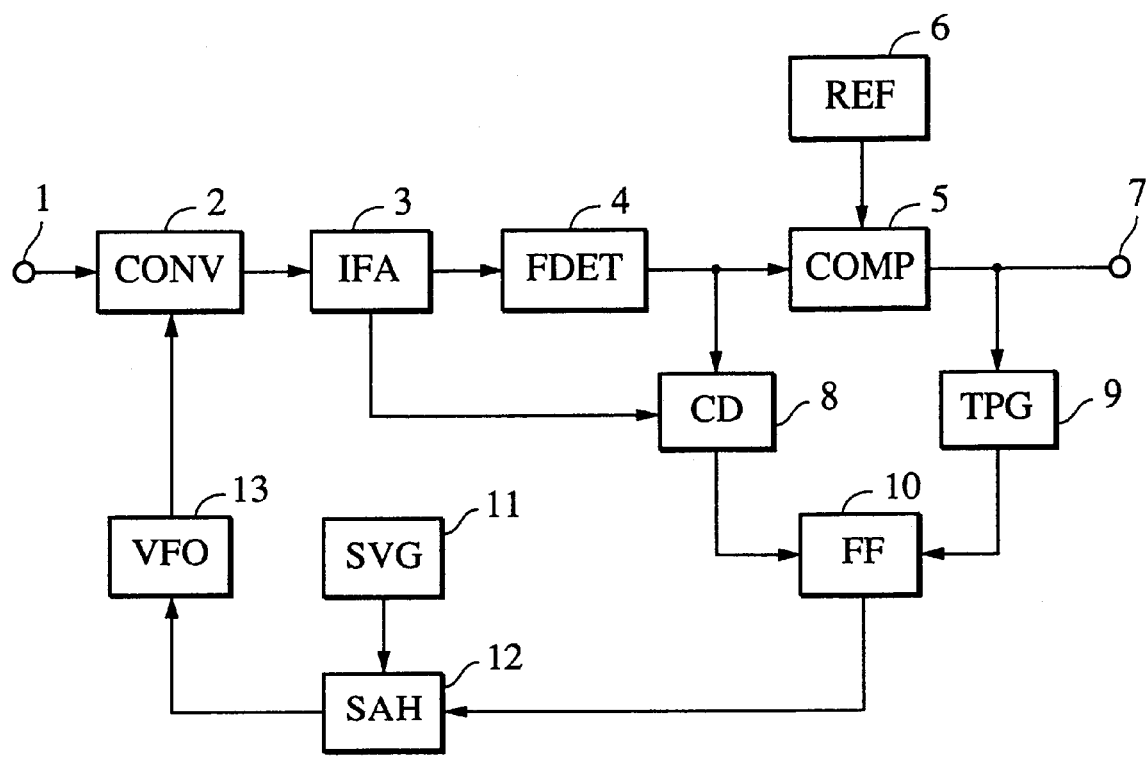
FIG. 1 is a circuit construction diagram for explaining an embodiment of the present invention.

In a frequency scanning receiver for a packet FSK signal of such type that a duration to issue a center frequency is provided in a head portion of a packet, frequency scanning is done by applying a sawtooth voltage to a variable frequency oscillator (VFO) as a local oscillator. If there is a center frequency, a moment (conversion point) at which a center level of a demodulated base band signal becomes zero exists on the way of this scanning. Accordingly, when said moment is detected, a center frequency error can be made zero by stopping said frequency scanning and holding a frequency of the VFO as it is until end of the packet.

Hereinbelow an embodiment of the present invention will be explained, referring to a drawing.

FIG. 1 is a circuit construction diagram of a frequency scanning receiver according to the invention. In FIG. 1, reference numeral 1 is an input terminal for a packet signal having an intermediate frequency, 2 is a frequency converter (CONV), 3 is an intermediate frequency amplifier (IFA), 4 is a frequency detector (FDET) which is a frequency discriminator and the like, 5 is a comparator (COMP), 6 is a reference voltage generator (RFG), 7 is an input terminal for a demodulated base band signal, 8 is a carrier detector (CD), 9 is a conversion point detector (TPG), 10 is a flip-flop circuit (FF), 11 is a scanning voltage generator (SVG), 12 is a sample & hold circuit (SAH), 13 is a variable frequency oscillator (VFO) as a frequency converting local oscillator.

Firstly, a packet signal having a radio frequency or a first intermediate frequency is applied to the input terminal 1 and is converted to an intermediate frequency signal by the frequency converter 2. After the intermediate frequency signal is amplified by the intermediate frequency amplifier 3, it is detected by the frequency detector 4 to provide a base-band signal. This base band signal is applied to the carrier detector 8, in which it is judged whether the signal is inputted or not, and when the signal is not inputted thereto, the flip-flop circuit 10 is reset. This carrier detection may be done by using the intermediate frequency signal from IFA 3 as shown with a dotted line in FIG. 1.

When the flip-flop circuit 10 is reset, the sample & hold circuit 12 outputs an output scanning voltage (for example, a sawtooth voltage) from the scanning voltage generator 11 and the variable frequency oscillator 13 is driven by it to do said frequency scanning.

When a packet signal having a center frequency in a head portion thereof is applied to the input terminal 1, this signal is frequency-scanned in the frequency converter 2 and passes through the intermediate amplifier 3 and the frequency detector 4. So the carrier detector 8 judges "there is a signal". As a result, the flip-flop circuit 10 becomes in a setable condition wherein it is set as soon as it receives a setting signal.

On the other hand, since the demodulated base band signal outputted from the frequency detector 4 is scanned in the duration to issue the central frequency, if it is scanned by a sawtooth voltage, said signal have a level that varies linearly from positive to negative or from negative to positive. This signal is applied to the comparator 5 and thus the comparator 5 produce's an output signal which varies from "1" to "0" or from "0" to "1" when said demodulated base band signal passes through 0V (reference voltage) if a reference voltage of the reference voltage generator is 0V. The conversion point detector 9 produces a positive pulse in response to the output voltage from the comparator 5. Therefore, the flip-flop circuit 10 is set by the positive pulse so that the sample & hold circuit 12 holds a sample value of a scanning voltage just before the flip-flop circuit 10 is set. As a result, an output frequency of VFO13 is held.

As is apparent from the previous explanation, the sample value of this held scanning voltage is a control voltage for VFO13 to make the IF signal coincide with the center frequency of the packet signal, that is, to remove the center frequency error. Therefore, correct demodulation without frequency error can be attained by doing demodulation keeping up that hold condition.

As previously explained in detail, according to the present invention, in a frequency scanning receiver for a packet FSK signal of such a type that a duration to issue a center frequency is provided in a head portion thereof, a center frequency error can be corrected by a correcting circuit having very simple construction and margin of demodulation can be made maximum.

What is claimed is:

1. A frequency scanning receiver for a packet FSK signal of such a type that a duration to issue a central frequency is provided in a head portion thereof comprising:

conversion point detecting means for detecting a time point when a demodulated base band signal obtained by demodulating said packet FSK signal pass through a conversion point in said duration; and hold means for holding a scanning voltage to scan said packet FSK signal.

2. A frequency scanning receiver according to claim 1 wherein said conversion point detecting means includes a comparator for comparing said demodulated base band signal with a reference voltage and a carrier detector for detecting whether there is said base band signal or a IF signal or not, a conversion point detector for detecting inversion of an output signal from the comparator at said time point, and a flip-flop circuit set by an output signal of said conversion point detector and reset by an output signal from said carrier detector representing that there is no said packet FSK signal; and wherein said hold means includes a sample & hold circuit a sample value of said scanning voltage by a set output from said flip-flop circuit.

* * * * *